United States Patent [19]
Schmidt

[11] 3,860,453
[45] Jan. 14, 1975

[54] NON-SPILL VENT VALVE FOR LIQUID ELECTROLYTE BATTERY

[75] Inventor: Jacob E. Schmidt, Great Notch Twp., Little Falls, Passaic County, N.J.

[73] Assignee: McGraw-Edison Company, Elgin, Ill.

[22] Filed: Oct. 30, 1972

[21] Appl. No.: 301,871

[52] U.S. Cl. ............................. 136/177, 136/179
[51] Int. Cl. .......................................... H01 1/06
[58] Field of Search ............... 136/177, 179, 178; 220/44 C, 44 D

[56] References Cited
UNITED STATES PATENTS
2,394,333  2/1946  Schneider ..................... 136/179
2,694,745  11/1954  Kennedy ....................... 136/177
3,303,105  2/1967  Konihoff et al. ............... 55/16 X
3,559,840  2/1971  Wilson ........................ 136/177 X Primary Examiner—Patrick P. Garvin
Assistant Examiner—John F. Niebling
Attorney, Agent, or Firm—George H. Fritzinger

[57] ABSTRACT

A closure valve for a liquid electrolyte battery is provided without moving parts to prevent spillage when the battery is tilted or inverted and to permit venting of gases when the battery is upright. The valve comprises a closure cap with a vent opening therethrough and with a pair of spaced microporous diaphragms intersecting the vent opening.

2 Claims, 6 Drawing Figures

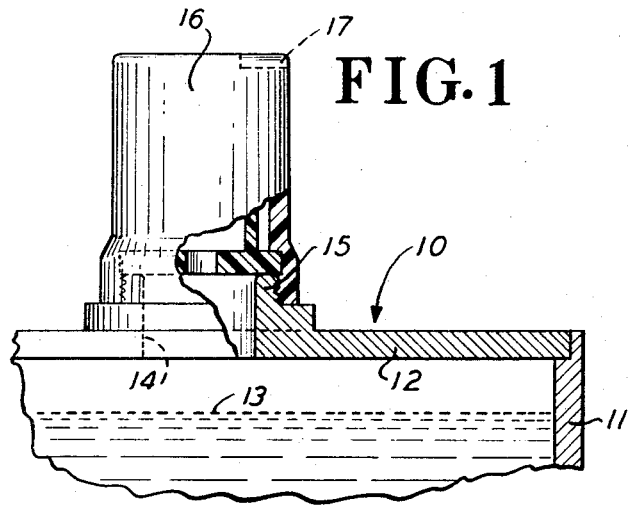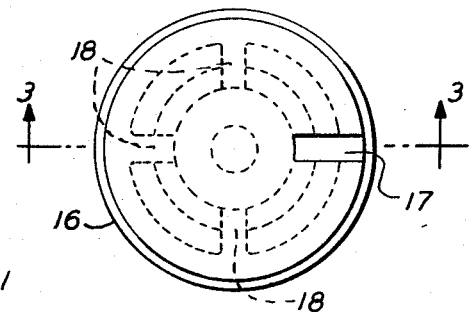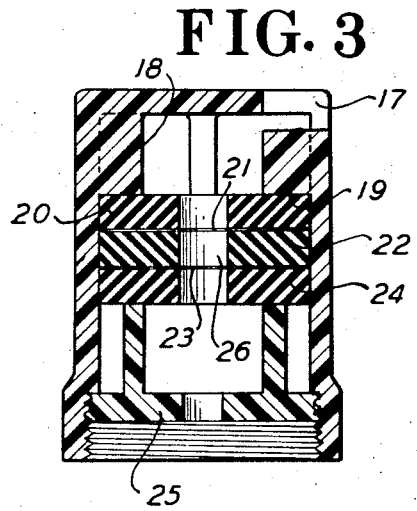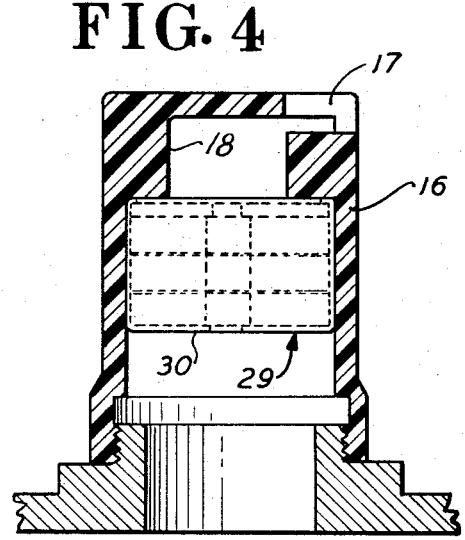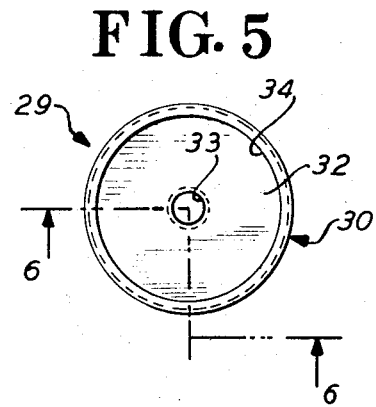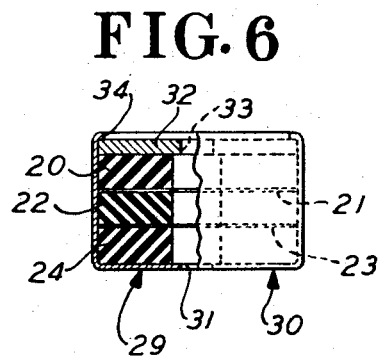

NON-SPILL VENT VALVE FOR LIQUID ELECTROLYTE BATTERY

An object of the invention is to provide a positively non-spillable gas pervious valve for a liquid electrolyte battery without the use of moving parts.

Another object is to provide a simple and economical filler cap for a liquid electrolyte battery which will not leak electrolyte when the battery is tilted, shaken or inverted and which will provide gas venting from the battery to prevent pressure build-up when the battery is upright.

Another object is to provide a valve for a liquid electrolyte battery which is rendered liquid impervious and gas pervious by the use of microporous diaphragms in the vent opening clamped liquid tight in a spaced relationship to each other.

Another object is to provide such valve in the form of a unitary capsule which can be mounted in sealed relation to the opening in the cover of the battery case.

These and other objects and features of the invention will be apparent from the following description and the appended claims.

In the description of my invention reference is had to the accompanying drawings of which:

FIG. 1 is an elevational view of a cover plate section of a battery with a threaded filler cap opening and with a filler cap according to the invention screw threaded thereon;

FIG. 2 is a top plan view of this filler cap and vent valve;

FIG. 3 is a vertical section on the line 3—3 of FIG. 2;

FIG. 4 is a cross section of an alternative embodiment of a filler cap showing the valve in the form of a self-contained capsule;

FIG. 5 is an end view of this capsule; and

FIG. 6 is a sectional view of the capsule on the line 6—6 of FIG. 5.

In FIG. 1 there is shown a top portion of a battery, in section, having a case 10 with a sidewall 11 and cover plate 12. The battery contains a liquid electrolyte 13 which by way of example may be an alkaline electrolyte such as sodium or potassium hydroxide or an acid electrolyte such as sulphuric acid depending on the type of battery used. By way of example, the present invention is described in connection with a primary battery using a potassium hydroxide electrolyte. This battery has a filler opening 14 in the cover plate surrounded by an upstanding external rim 15 adapted to receive an open ended internally threaded filler cap 16 in threaded engagement therewith. The cap is cylindrically shaped and provided with a slot 17 in its end wall to permit venting of gases from the battery through the filler opening during discharge as well as during standby.

In the handling and shipping of such batteries as during the transportation from the factory to the places of use, the batteries may be tilted, bumped against each other and be even upset. It is necessary that there be no leakage of electrolyte during such handling because it can be damaging to any surfaces it may contact and very injurious to the hands or body. It is required therefore that the gas venting means be liquid tight against any leakage or spillage of the electrolyte. Heretofore, many filler caps with vent valves have been proposed which employ moving parts that are position sensitive so that the valve is closed to prevent leakage or spillage of liquid electrolyte when the batteries are tilted beyond a predetermined angle from the horizontal. These have not however been very reliable. The present filler cap is one without moving parts which is positively non-spillable and which is yet gas pervious when the battery is in a sufficiently upright position to prevent direct contact of the liquid electrolyte with the valve.

In one embodiment of the invention wherein the vent valve is incorporated in the filler cap 16, this cap is provided with a vent slot 17 in the end wall and with a plurality of internal radial ribs 16 to form shoulders 19 against which a clamping pressure may be exerted. Seated against the shoulders 19 and engaging the inside wall of the cap is a washer 20 of yieldable material such as of rubber. A first circular microporous diaphragm 21 inert to the electrolyte is clamped against the washer 20 by a second washer 22 and a second such circular microporous diaphragm 23 is clamped against the washer 22 by a third washer 24. Suitable microporous diaphragms for the present battery may be of polypropylene or of Teflon. Clamping pressure against the stack of washers and diaphragms is obtained by a centrally apertured screw plug 25 threaded into the outer end of the cap. After the plug 25 is screwed firmly in place it is cemented and sealed to the cap 16. For example, the cap and plug may be made of acrylic plastic material and the plug be cemented in place by an acrylic solvent such as tetrahydrofuran.

The invention comprehends that at least two spaced microporous diaphragms be employed. In such construction a gas space 26 is captured between the two diaphragms 21 and 23 bounded by the inner wall of the intermediate washer 22. This gas space 26 becomes a 100 percent humidity atmosphere by reason of the diffusion of gases from the battery first through the bottom diaphragm 23 and then through the space 26 and top diaphragm 21 to the outside. The top diaphragm therefore protects the bottom diaphragm from the atmosphere - which is all important in the continuing operation of the present filler cap because if air were to contact the upper side of the bottom diaphragm and the alkaline electrolyte the bottom side thereof crystalline carbonate deposits would form in the diaphragm and through the pores thereof by the reaction of the electrolyte with the carbon compounds of the atmosphere to render the diaphragm air impervious.

In the alternative embodiment shown in FIGS. 4, 5 and 6 the stack of washers 20, 22, and 24 with intermediate diaphragms 21 and 23 are provided in a unitary capsule 29. This capsule comprises a deep drawn steel cup 30 having a central vent hole 31 in the bottom wall in registration with the central openings of the washers. A clamping washer 32 as of steel is mounted on the top washer 20 and is provided with a central vent hole 33. The top edge of the cup is swaged at 34 against the washer 32 to provide the necessary clamping pressure of the washers against the diaphragms.

The unitary capsule 29 is fitted into the filler cap 16 against the inner radial ribs 18. Since no clamping pressure is necessary within the filler cap 16 against the capsule, the capsule is retained in the cap 16 and sealed air tight to the inside wall thereof by the use of a suitable cement such as of an epoxy.

The embodiments of my invention herein particularly shown and described are intended to be illustrative and not necessarily limitative of my invention, since the same is subject to changes and modifications without departure from the scope of my invention, which I endeavor to express according to the following claims.

I claim:

1. A non-spill vent valve for a liquid electrolyte battery comprising a container having a passageway therethrough for venting of gases from the battery to the outside atmosphere, means for securing said container liquid tight onto the cover of a battery case in registration with an opening therein, and a plurality of spaced microporous diaphragms in said vent passageway secured hermetically around the outer rims there-of to the inside wall of said container to provide a gas space in said passageway accessible only by diffusion of gases through said diaphragms with one diaphragm exposed to the atmosphere of the battery and the other diaphragm exposed to the outside atmosphere, wherein said vent valve comprises a unitary capsule in said vent passageway including a metal cylindrical cup of a material inert to said electrolyte said cup having a central opening in its inner end wall, and said cup having a stack of rubber washers and of intervening circular microporous diaphragms between adjacent pairs of said washers fitted into said cup, and a metal washer in the outer end of said cup with the edge of said cup crimped over onto said metal washer to exert clamping pressure against said stack.

2. The vent valve set forth in claim 1 wherein said container comprises a cylindrical plastic cap adapted for engagement with the cover plate of said battery in registration with an opening therein, and wherein said capsule is fitted into said plastic cap with the metal cup of the capsule sealed fluid tight to the internal wall of the plastic cap.

* * * * *